3,110,598
PROCESS OF MAKING A CAROTENOID PREPARATION

Paul Müller, Bottmingen, and Rudolf Tamm, Basel, Switzerland, assignors to Hoffmann-La Roche Inc., Nutley, N.J., a corporation of New Jersey
No Drawing. Filed Aug. 29, 1960, Ser. No. 52,358
Claims priority, application Switzerland Sept. 8, 1959
7 Claims. (Cl. 99—148)

This invention concerns carotenoid preparations and processes for making the same.

Carotenoids such as carotene, lycopene, bixin, zeaxanthin, cryptoaxanthin, lutein, canthaxanthin, $\beta$-apo-8'-carotenal and esters of hydroxyl- or carboxyl-containing members of this group have attained considerable importance in technology as coloring agents. Carotenoids are yellow to red pigments which possess considerable interest as replacements for synthetic coloring agents, for use as coloring materials, e.g. for foodstuffs; in consequence of the relationship of the carotenoids to, or their identity with, pigments occurring in the plant and animal kingdoms. All carotenoids are substances which are insoluble in water and which are relatively high-melting. Moreover, carotenoids are substances which are very sensitive to oxidation. These characteristics militate against direct employment of the crystalline materials for coloration of foodstuffs or feedstuffs; in this form, the materials are poorly resorbed or give poor coloring effects. The above mentioned characteristics of carotenoids are especially disadvantageous in the coloring of liquid media; since, as a result of the water-insolubility of carotenoids, it is quite difficult to obtain a homogeneous color effect.

It has already been attempted to make carotenoid preparations suitable for practical purposes by dissolving carotenoids in oils or fats. In consequence of the slight solubility of carotenoids in these solvents, it has only been possible, however, to attain very low concentrations of carotenoids in such preparations. By making supersaturated solutions with the aid of heat, this disadvantage can be overcome to a certain extent. Inasmuch, however, as heating of carotenoids results in partial decomposition, and usually in isomerization of the compounds with resulting influence on the color tone, this procedure also does not satisfy all requirements. Likewise, grinding of carotenoids affects the product very greatly, especially when grinding to a particle size suitable for practical purposes.

It has now been found according to the invention that a carotenoid preparation of suitable degree of subdivision can be prepared, with economical use of materials, by emulsifying a solution of a carotenoid, the menstruum of which is comprised at least predominantly of a volatile, water-insoluble carotenoid solvent, in an aqueous solution of a swellable colloid, and removing the volatile solvent from the resulting emulsion in a manner known per se. Also, one can prepare a second emulsion from the carotenoid preparation obtained in the manner described above and additional quantities of fresh carotenoid solution, and again remove the volatile solvent from said second emulsion. By repeatedly recycling back to the process the carotenoid preparation obtained, one can thus attain considerable increase of carotenoid content in the end product. This procedure can be employed especially advantageously by continuously recycling the carotenoid-containing product back to the process.

The product obtained can be used as such for coloring purposes. Advantageously, however, it is converted into small dry particles by methods known per se, e.g. by spraying.

The swellable colloid used in the processes of the invention is preferably gelatin, gum arabic, dextrin or polyvinyl alcohol. However, also suitable are, for example, pectin, polyvinylpyrrolidone, starch, methylcellulose, carboxymethylcellulose, gum tragacanth, and alginates. It is advantageous to add a plasticizer to the colloid, such as sugar and/or sugar alcohols, in order to increase the stability of the end product toward mechanical influences. Suitable plasticizers are, for example, saccharose, invert sugar, glucose, sorbitol, mannitol and glycerine.

The menstruum of the carotenoid solutions employed in the processes of the invention preferably is comprised substantially entirely of a volatile, water-insoluble carotenoid solvent, especially such solvents which are readily evaporated or steam-distilled. Appropriately employed are lower halohydrocarbons, e.g. chloroform, methylene chloride, carbon tetrachloride and trichlorethylene; the two first-named materials being especially preferred. Another good solvent for carotenoids, which can be employed in the processes according to the present invention, is carbon disulfide.

If the menstruum employed to dissolve the carotenoid is comprised substantially exclusively of a volatile carotenoid solvent, there are obtained carotenoid preparations according to the invention which contain only relatively small quantities of foreign materials. In certain circumstances, however, it is appropriate to employ a carotenoid solution which contains, in addition to the volatile carotenoid solvent, an oil or a fat; and to emulsify the resulting mixture in an aqueous solution of a swellable colloid. The volatile solvent is removed from the resulting emulsion in a manner known per se, e.g. by distillation, which appropriately can be effected under diminished pressure.

A significant advantage of the procedures of the present invention resides in the fact that the processing can be executed with significant economies in effective utilization of carotenoid starting materials. In addition, the danger of isomerization of the material is avoided, and thus the original coloring effect of the carotenoid employed can be maintained. The processes according to the invention offer a further advantage in that they afford increased carotenoid content in the end products.

The carotenoid preparation obtained after removal of the volatile solvent is a viscous, highly-colored sol, when a non-gelable colloid is employed; otherwise, the sol solidifies with formation of a gel. The carotenoid is exceptionally finely divided in this preparation, and one can obtain without difficulty preparations wherein the bulk of the carotenoid is present in a degree of fineness of from about 2 to about 3 microns, particles above 5 microns in size being substantially absent. The product even when in gel form can also be diluted with water in desired proportions, whereby the carotenoid pigment is uniformly dispersed in the solution and is stable in this condition. In the event that a dry powder is made by spraying the above described sols of the invention, the powder likewise can be dissolved in water with attainment of uniform dispersion.

The invention is further disclosed in the following examples, which are illustrative but not limitative thereof.

Example 1

1500 g. of gelatin is dissolved in 1.5 l. of water, mixed with a solution of 300 g. of saccharose in 300 ml. of water, and the whole is heated to 50° C. Then, a solution of 210 g. of trans-$\beta$-carotene in 800 ml. of acid-free chloroform, at 50° C., is added to the mixture, while emulsifying mechanically and with precautions to exclude oxygen of the air. The resulting emulsion is then freed of chloroform by distillation at 50° C. under reduced pressure, whereby approximately 3800 g. of a suspension of uniformly fine solid $\beta$-carotene particles (1 to 3 microns) is formed. Upon cooling, the sol goes over to a gel. The latter contains about 5% trans-β-carotene. It can be diluted with water upon slight heating, or can be sprayed and worked up to a dry powder.

*Example 2*

1500 g. of gum arabic is dissolved in 1.5 l. of water and mixed with a solution of 300 g. of invert sugar in 300 ml. of water. This solution is heated to 35° C. and is continuously fed into an emulsifying apparatus, simultaneously with a solution of 450 g. of trans-β-apo-8'-carotenal in 3.2 l. of methylene chloride at 35° C. The emulsion produced is continuously drawn off into a distillation apparatus and there freed of methylene chloride at 50° C. under reduced pressure. There is thus obtained about 4 kg. of a sol (or respectively, a gel) containing about 10% of uniformly fine trans-β-apo-8'-carotenal (1 to 3 microns).

*Example 3*

1500 g. of gelatin is dissolved in 1.5 l. of water, mixed with a solution of 300 g. of sorbitol in 900 ml. of water and heated to 50° C. Into this mixture is introduced, slowly and while emulsifying mechanically, a solution of 1800 g. of trans-β-apo-8'-carotinic acid methyl ester in 4 l. of carbon tetrachloride at 50° C. During the emulsification procedure, a portion of the emulsion is continuously removed through a suction tube and introduced into a distillation apparatus, where it is freed of carbon tetrachloride by distillation at 50° C. under reduced pressure, and the product obtained is recycled to the emulsification vessel. Thus the proportion of finely divided carotenoid in the emulsion is gradually increased, without destruction of the emulsion by reason of excessive content in the organic phase. The sol (or respectively, gel) produced (about 5.4 kg.) contains at the end of the procedure about 30% of trans-β-apo-8'-carotinic acid methyl ester in homogeneous, finely divided form (1 to 3 microns).

*Example 4*

1800 g. of dextrin is dissolved in 1.8 l. of water. This solution is heated to 40° C. and, simultaneously with a solution of 475 g. of trans-canthaxanthin in 2 l. of carbon disulfide at 40° C., is continuously introduced into an emulsifying apparatus. The emulsion produced is continuously transferred to a distillation apparatus, and there freed of carbon disulfide at 50° C. under reduced pressure. In the suspension thus produced, which contains about 10% of canthaxanthin, is emulsified in a second step, by repeating the process, a solution of an additional quantity of 475 g. of canthaxanthin in 2 l. of carbon disulfide. After again continuously freeing the mixture of solvent, there is obtained about 4.5 g. of a sol (or respectively, gel) having a content of about 20% trans-canthaxanthin.

*Example 5*

1000 g. of polyvinyl alcohol is dissolved in 2 l. of water and mixed with a solution of 300 g. of glycerine in 300 ml. of water. The solution is heated to 50° C. and is introduced continuously, simultaneously with a solution of 530 g. of trans-β-apo-8'-carotenal in 1.8 l. of trichlorethylene at 50° C., into an emulsifying apparatus. The emulsion formed is continuously introduced into a distillation apparatus, there freed of trichlorethylene at 50° C. under reduced pressure, and immediately introduced into a second emulsifying apparatus, together with a fresh solution of 530 g. of trans-β-apo-8'-carotenal in 1.8 l. of trichlorethylene at 50° C. In a second distillation apparatus, the trichlorethylene is again removed. The entire procedure is again executed in a third apparatus setup, in the same manner described above, so that in three steps a total of 1590 g. of trans-β-apo-8'-carotenal is processed. There is thus obtained about 5 kg. of a sol (or respectively, gel) having a content of about 30% trans-β-apo-8'-carotenal.

*Example 6*

300 g. of gelatine are dissolved in 300 ml. of water, mixed with a solution of 1500 g. of saccharose in 1500 ml. of water, and heated to 50° C. By treating the solution formed with 210 g. of trans-β-carotene according to the method described in Example 1, there is obtained a product that is easily soluble already in cold water.

We claim:

1. A process for making a preparation containing a carotenoid in finely divided form which comprises the steps of: (1) emulsifying (a) a solution of a carotenoid, wherein the menstruum is comprised at least predominantly of a volatile, water-insoluble carotenoid solvent, in (b) an aqueous solution containing a swellable colloid; and (2) removing said volatile, water-insoluble carotenoid solvent from the emulsion.

2. A process according to claim 1 wherein said carotenoid is selected from the group consisting of carotene, lycopene, bixin, zeaxanthin, cryptoxanthin, lutein, β-apo-8'-carotenal and lower carbalkoxy and lower carboxyalkyl derivatives of the foregoing.

3. A process according to claim 1 wherein said volatile, water-insoluble carotenoid solvent is selected from the group consisting of lower halohydrocarbons and carbon disulfide.

4. A process according to claim 1 wherein said swellable colloid is selected from the group consisting of gelatine, gum arabic, dextrin, polyvinyl alcohol, pectin, polyvinylpyrrolidone, starch, methylcellulose, carboxymtheylcellulose, gum tragacanth and alginates.

5. A continuous and cyclic process according to claim 1 wherein the product of step (2) is continuously recycled back to step (1).

6. A process which comprises the two steps (1) and (2) of claim 1 and an additional step (3) of spray-drying the product of said step (2).

7. A process according to claim 1 wherein said aqueous solution containing a swellable colloid also contains a plasticizer selected from the group consisting of sugars, sugar alcohols, and mixtures thereof.

References Cited in the file of this patent

UNITED STATES PATENTS

| | | |
|---|---|---|
| 1,879,762 | Nitardy | Sept. 27, 1932 |
| 2,470,703 | Kern et al. | May 17, 1949 |
| 2,650,895 | Wallenmeyer et al. | Sept. 1, 1953 |
| 2,861,891 | Bauernfeind et al. | Nov. 25, 1958 |